J. R. RUMMERFIELD.
DIRECTION INDICATOR.
APPLICATION FILED OCT. 4, 1916.
1,299,863.
Patented Apr. 8, 1919.
2 SHEETS—SHEET 1.
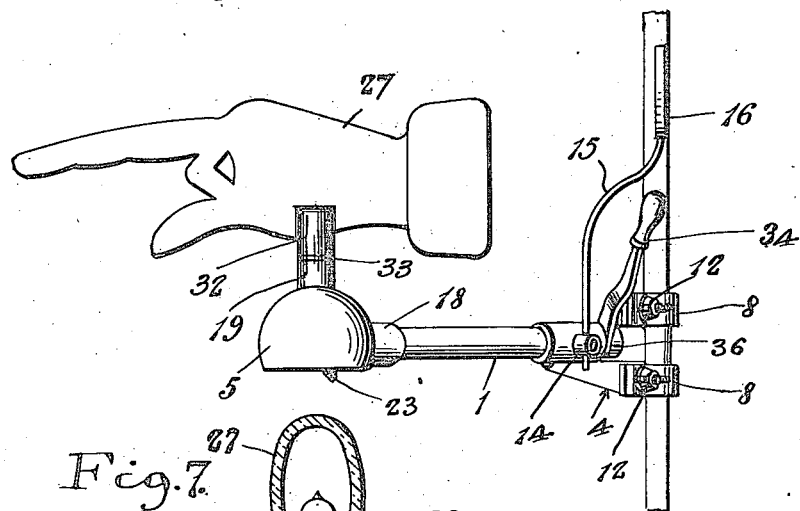
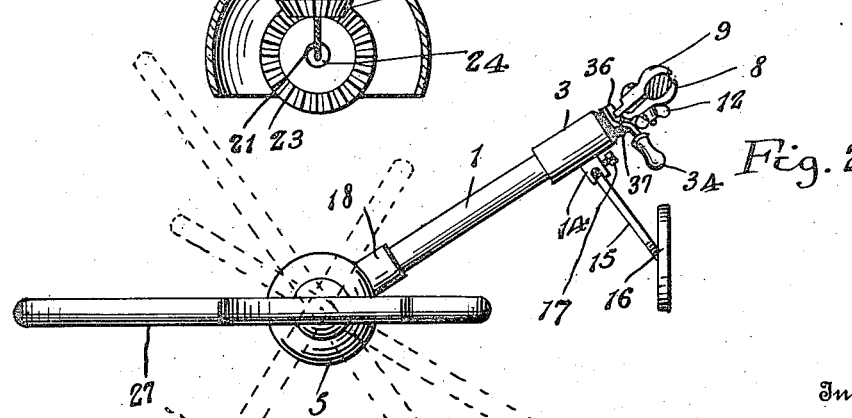
Inventor
J. R. Rummerfield.

J. R. RUMMERFIELD.
DIRECTION INDICATOR.
APPLICATION FILED OCT. 4, 1916.
1,299,863.
Patented Apr. 8, 1919.
2 SHEETS—SHEET 2.
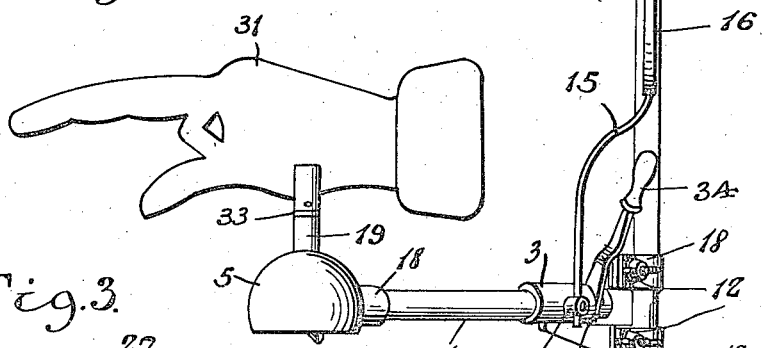
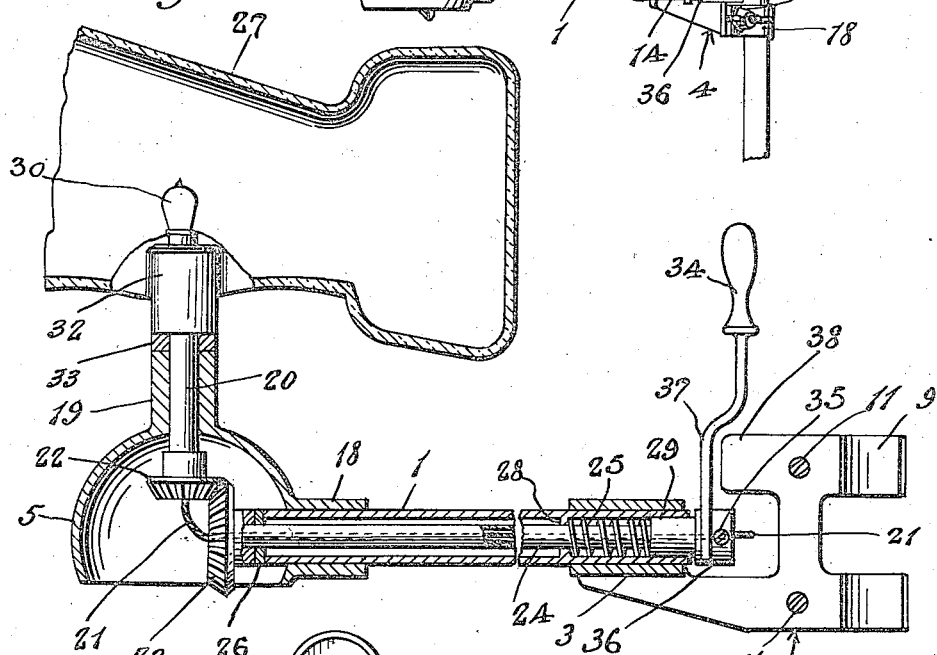
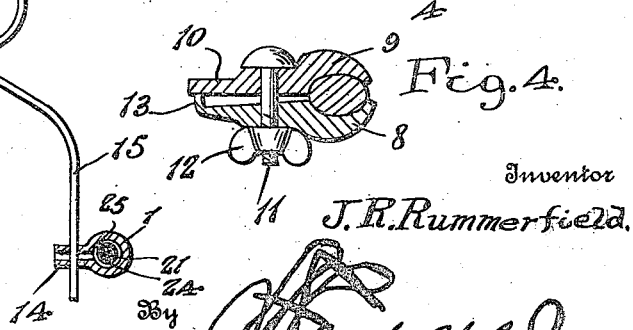
Inventor
J. R. Rummerfield.

UNITED STATES PATENT OFFICE.

JOSEPH R. RUMMERFIELD, OF PLATTSMOUTH, NEBRASKA.

DIRECTION-INDICATOR.

1,299,863.  Specification of Letters Patent.  Patented Apr. 8, 1919.

Application filed October 4, 1916. Serial No. 123,796.

*To all whom it may concern:*

Be it known that I, JOSEPH R. RUMMERFIELD, a citizen of the United States, residing at Plattsmouth, in the county of Cass and State of Nebraska, have invented certain new and useful Improvements in Direction-Indicators; and I do hereby declare the following to be a full, clear, and exact description of the invention, such as will enable others skilled in the art to which it appertains to make and use the same.

The invention relates to improvements in direction indicators.

The object of the present invention is to improve the construction of direction indicators for automobles and various other motor vehicles and other conveyances and to provide a simple, efficient and practical direction indicator of inexpensive and durable construction adapted to be readily applied to the wind shield of an automobile at either side thereof or to a relatively fixed portion of an automobile or other vehicle and adapted to extend laterally from the same in a forwardly direction and equipped with a signaling element or index member adapted to be readily seen from the front, back and both sides of a machine and capable of being readily set for indicating the direction in which the vehicle intends to move and of remaining in such position until the crossing or other signaling point is passed.

A further object of the invention is to provide a direction indicator of this character adapted to be employed either with or without an electric light and capable of also forming a convenient support for a mirror.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings—

Figure 1 is a side elevation of a direction indicator constructed in accordance with this invention, and shown applied to the wind shield of an automobile, Fig. 2 is a plan view of the same.

Fig. 3 is an enlarged longitudinal sectional view of the direction indicator, portions of the indicating or signaling hand or member being broken away, Fig. 4 is a detail sectional view illustrating the construction of the clamping jaws, Fig. 5 is a detail view partly in section illustrating the manner of mounting the mirror, Fig. 6 is a side elevation of a direction indicator provided with a sheet metal indicating or signaling hand or member, Fig. 7 is a transverse sectional view of the form of the invention shown in Figs. 1 to 3 inclusive.

Like numerals of reference designate corresponding parts in the several figures of the drawings.

In the accompanying drawings in which is illustrated the preferred embodiment of the invention, the direction indicator comprises in its construction, a horizontally disposed tubular supporting arm or member 1 designed to extend forwardly and laterally from an automobile or other motor vehicle at the wind shield or other part of the front portion of the machine and having its inner or rear end fitted in a sleeve 3 of a supporting bracket 4, and equipped at its outer end with a casing or housing 5. The supporting bracket 4 is provided with integral horizontal and vertical arms 6 and 7 and it is also provided with upper and lower jaws 8 which coöperate with relatively movable or adjustable jaws 9 of upper and lower clamping plates 10 which are secured to the bracket at the upper and lower ends of the vertical arm 7 by bolts 11. The bolts 11 are provided with thumb nuts 12 and the clamping plates have inwardly projecting flanges 13 at their inner ends to form a fulcrum or bearing for each of the clamping plates. The clamping device formed by the jaws of the bracket and vice formed by the jaws of the bracket and the clamping plates enable the direction indicator to be easily and quickly applied to any ordinary automobile and it also permits adjustment of the direction indicator so that the latter will extend from the automobile at the desired angle to enable the direction indicator to be readily seen from both the front and back and also from either side of the machine. The sleeve 3 of the bearing bracket is arranged horizontally at the upper edge of the horizontal arm 6 and it is preferably provided with a perforated lug 14 adapted to receive the stem or rod 15 of a mirror 16. The rod or stem of the mirror 15 may be adjustably secured in the perforation or opening of the lug by a set screw 17 or other suitable fastening means.

The casing or housing which is approximately semi-spherical is open at the bottom and it is provided at the inner side with a horizontal sleeve or tubular extension 18 and it has a vertical bearing 19 at the top consisting of a tubular extension or sleeve and receiving a vertical shaft 20. The vertical shaft 20 which is preferably hollow or tubular to provide a passage for a conductor wire 21 has suitably secured to its lower end a horizontal bevel pinion 22 located within the upper portion of the housing or casing and meshing with a vertical bevel gear 23 mounted on a horizontal shaft 24 which is carried by the tubular arm or member 1. The horizontal shaft 24 is urged inwardly or rearwardly by a coiled spring 25 to cause a washer 26 to be frictionally engaged by the outer end of the tubular member or arm 1 and the vertical gear wheel 23, whereby the shaft and an indicating or signaling hand or member 27 is maintained in its adjustment. The coiled spring is interposed between collars 28 and 29 located respectively within the tubular arm or member and on the shaft. The washer 26 may be constructed of rubber, leather or any other suitable material and it is preferably interposed between the hub portion of the gear wheel 23 and the outer end of the tubular member 1.

The vertical shaft which is extended above the tubular bearing 19 carries an electric light 27 which is preferably of the one contact character in ordinary use on automobiles and the indicating or signaling hand or member shown in Figs. 1 to 3 inclusive is constructed of hollow glass preferably colored and adapted to be illuminated by the electric lamp. Instead, however, of employing a hollow glass hand, a metallic hand 31 of sheet metal or other suitable material may be provided as illustrated in Fig. 6 of the drawings and an electric light may be mounted upon a hand of this character if desired in any suitable manner.

The hollow glass hand is preferably provided at the bottom with a neck or tubular portion 32 and a washer 33 of rubber or other suitable material is preferably interposed between the tubular connecting portion 32 of the glass hand and the bearing 19. The horizontal shaft is provided at its inner end with an operating handle or arm 34 secured at one end to the inner or rear end of the horizontal shaft by a pin or key 35 and having an integral band 36 to fit the inner end of the horizontal shaft. The operating arm is bent intermediate of his ends at 37 to clear an extension 38 of the vertical arm 7 and the adjacent portion of the upper clamping plate and it is adapted to be oscillated in either direction for rotating the vertical shaft to turn the indicating or signaling hand or member in the desired direction. The horizontal gear is approximately one-half the diameter of the vertical gear and the movement of the operating arm or handle 34 is sufficient to turn the said hand either to the right or to the left and also to entirely reverse the hand for indicating that the machine is to be completely turned around or backed. The conductor wire may extend to any suitable source of current supply. The sheet metal indicating hand 31 is preferably mounted in a slot or bifurcation of the upper portion of the vertical shaft but it may be secured to the same in any other desired manner.

What is claimed is:

1. A direction indicator comprising a substantially semi-spherical casing having its bottom open, a tubular extension formed on one side of said casing, a hollow supporting arm having one end secured in said extension, means securing said arm to an automobile at its other end, a shaft in said arm, a vertical bearing formed on the top of said casing, a shaft journaled in said bearing, a signaling member secured to the second named shaft, means connecting said shafts and located in said casing, and a controlling means connected to the first named shaft.

2. A direction indicator comprising a casing, an extension formed on said casing, a hollow arm secured in said extension, means securing said arm to an automobile, a shaft in said arm, a bearing formed on the casing, a shaft journaled in said bearing, a signaling member secured to the second named shaft, means connecting said shafts, a controlling means connected to the first named shaft, a washer secured to the first named shaft, and a spring in said arm and bearing against the same and the first named shaft to cause the washer to frictionally engage the arm.

In testimony whereof I affix my signature in presence of two witnesses,

JOSEPH R. RUMMERFIELD.

Witnesses:
JOSEPH E. DOUGLASS,
GEO. R. SAYLES.